(12) United States Patent
Klug et al.

(10) Patent No.: US 6,177,497 B1
(45) Date of Patent: Jan. 23, 2001

(54) ADDITIVES FOR INHIBITING GAS HYDRATE FORMATION

(75) Inventors: Peter Klug, Grossostheim; Frank Holtrup, Burgkirchen, both of (DE)

(73) Assignee: Clariant GmbH, Frankfurt (DE)

( * ) Notice: Under 35 U.S.C. 154(b), the term of this patent shall be extended for 0 days.

(21) Appl. No.: 09/240,190

(22) Filed: Jan. 29, 1999

(30) Foreign Application Priority Data

Jan. 29, 1998 (DE) .............................................. 198 03 384

(51) Int. Cl.⁷ ....................................................... C08K 5/06
(52) U.S. Cl. .............................. 524/376; 95/153; 585/15; 585/950
(58) Field of Search ............................................. 524/376

(56) References Cited

U.S. PATENT DOCUMENTS

| | | | | |
|---|---|---|---|---|
| 4,152,306 | * | 5/1979 | DeMatteo | 252/539 |
| 5,563,315 | * | 10/1996 | Forte | 585/835 |

FOREIGN PATENT DOCUMENTS

| | | |
|---|---|---|
| WO-96/08456 | 3/1996 | (WO) . |
| WO-96/08636 | 3/1996 | (WO) . |
| WO 96/38492 | 12/1996 | (WO) . |
| WO 98/23843 | 6/1998 | (WO) . |

OTHER PUBLICATIONS

Sloan, Clathrate Hydrates of Natural Gases, M. Dekker, New York, 1990.
W.D. Young et al., "Enhanced Hydrate Inhibitors: Powerful Synergism With Glycol Ethers", (American Chemical Society, vol. 42, No.2; Preprints of Papers presented at the 213th ACS National Meeting San Francisco, CA, Apr. 13–17, 1997).
EPO Search Report.
Abstract, XP–002118781, "Enhanced Hydrate Inhibitors: Powerful Synergism with Glycol Ethers".

* cited by examiner

*Primary Examiner*—Paul R. Michl
(74) *Attorney, Agent, or Firm*—Miles Dearth; Scott E. Hanf

(57) ABSTRACT

The invention relates to an additive for inhibiting gas hydrate formation, containing a) from 5 to 90% by weight of 2-isobutoxyethanol, b) from 5 to 60% by weight of a copolymer which has structural units which are derived from maleic acid, maleic anhydride or derivatives of maleic acid or of maleic anhydride, and c) at least 10% by weight of water or a monohydric or polyhydric alcohol, except the 2-isobutoxyethanol, or mixtures of the stated substances, based on the total weight of the additive, the sum of the contents of compounds a) and b) being from 10 to 90% by weight, and a process for inhibiting gas hydrate formation using 2-isobutoxyethanol.

16 Claims, No Drawings

ADDITIVES FOR INHIBITING GAS HYDRATE FORMATION

FIELD OF THE INVENTION

The present invention relates to an additive and a process for inhibiting nucleation, growth and/or agglomeration of gas hydrates by adding an effective amount of an inhibitor which contains 2-isobutoxyethanol to a multiphase mixture prone to hydrate formation and comprising water, gas and optionally condensate.

Gas hydrates are crystalline clathrate compounds of gas molecules in water which form under specific temperature and pressure conditions (low temperature and high pressure). The water molecules form cage structures around the corresponding gas molecules. The framework formed from the water molecules is by itself thermodynamically unstable and the framework is not stabilized until the inclusion of gas molecules, resulting in an icelike compound which can also exist above the freezing point of water (up to more than 25° C.), depending on pressure and gas composition. A review of the subject of gas hydrates is given in Sloan, Clathrate Hydrates of Natural Gases, M. Dekker, New York, 1990.

In particular, the gas hydrates which form from water and the natural gas components methane, ethane, propane, isobutane, n-butane, nitrogen, carbon dioxide and hydrogen sulfide are of major importance in the petroleum and natural gas industry. Particularly in natural gas production today, the existence of these gas hydrates presents a major problem, especially when wet gas or multiphase mixtures of water, gas and alkane mixtures under high pressure are exposed to low temperatures. Here, owing to the insolubility and crystalline structure, the formation of the gas hydrates leads to blockage of various transport means, such as pipelines, valves or production means, in which wet gas or multiphase mixtures are transported over relatively long distances at low temperatures, as occurs in particular in colder regions of the earth or at the bottom of the sea. Moreover, the gas hydrate formation can also give rise to problems under corresponding pressure and temperature conditions during the drilling process for developing new gas or petroleum deposits.

To avoid such problems, the gas hydrate formation in gas pipelines or during the transport of multiphase mixtures can be suppressed by using relatively large amounts (more than 10% by weight) of lower alcohols, such as methanol, glycol or diethylene glycol. The addition of these additives shifts the thermodynamic limit of gas hydrate formation to lower temperatures and higher pressures (thermodynamic inhibition). However, the addition of these thermodynamic inhibitors gives rise to major safety problems (flash point and toxicity of the alcohols), logistical problems (large storage tanks or recycling of these solvents) and accordingly high costs, especially in offshore production.

Today, attempts are therefore being made to replace thermodynamic inhibitors, in the temperature and pressure ranges in which gas hydrates can form, by adding additives (amount used<2% by weight) which either delay gas hydrate formation (kinetic inhibitors) or keep the gas hydrate agglomerates small and therefore pumpable, so that they can be transported through the pipeline (so-called agglomerate inhibitors or antiagglomerates).

In addition to the thermodynamic inhibitors, many classes of monomeric and polymeric substances which are kinetic inhibitors or agglomerate inhibitors have been described as gas hydrate inhibitors in the prior art.

WO-96/08636 describes surface-active substances as gas hydrate inhibitors which carry a polar head group and a hydrophobic radical, the hydrophobic radical containing not more than 12 carbon atoms. Sodium valerate, butanol, butyl sulfate and butyl sulfonate, alkylpyrrolidones and a zwitterion of the formula $R_2N(CH_3)_2$—$(CH_2)_4SO_3^-$ are mentioned as examples.

WO-96/08456 describes synergistic mixtures of the substances disclosed in WO-96/08636 with water-soluble copolymers.

W. D. Young et al. (American Chemical Society, Vol. 42, No.2; Preprints of Papers presented at the 213th ACS National Meeting San Francisco, Calif., Apr. 13–17, 1997) describe synergistic mixtures of amide polymers with lower alcohols and glycol ethers. Here, 2-butoxyethanol and 2-(2-butoxyethoxy)ethanol (butyldiglycol) exhibit particularly good efficiency.

To be able to use gas hydrate inhibitors also at lower temperatures than is possible at present, i.e. further within the hydrate region, a further increase in the activity of the available hydrate inhibitors is necessary. It was therefore the object of the present invention to find improved additives which slow down the formation of gas hydrates (kinetic inhibitors) or which keep gas hydrate agglomerates small and pumpable (antiagglomerates), in order to be able to replace the thermodynamic inhibitors (methanol and glycols) which are still used at present and give rise to considerable safety problems and logistical problems.

SUMMARY OF THE INVENTION

As has now surprisingly been found, the glycol ether 2-isobutoxyethanol has substantially better efficiency as a gas hydrate inhibitor than the alcohols and glycol ethers described to date in the prior art.

As shown in the attached examples, 2-isobutoxyethanol in a low dose can suppress the formation of gas hydrates far more effectively than is possible using the same amount of 2-butoxyethanol which is known from the literature.

The invention relates to an additive for inhibiting gas hydrate formation, containing a) from 5 to 90% by weight of 2-isobutoxyethanol, b) from 5 to 60% by weight of a copolymer which has structural units which are derived from maleic acid, maleic anhydride or derivatives of maleic acid or of maleic anhydride, and c) at least 10% by weight of water or a monohydric or polyhydric alcohol, except the 2-isobutoxyethanol, or mixtures of the stated substances, based on the total weight of the additive, the sum of the contents of compounds a) and b) being from 10 to 90% by weight.

DESCRIPTION OF THE PREFERRED EMBODIMENTS

The additives according to the invention contain preferably from 10 to 80, in particular from 15 to 50, % by weight of 2-isobutoxyethanol and preferably from 10 to 50% by weight, in particular from 20 to 30% by weight, of a copolymer corresponding to b) as defined above. The sum of the contents is preferably from 20 to 80% by weight. Further components of the additive are, according to c), water and monohydric or polyhydric alcohols except for 2-isobutoxyethanol, in an amount of at least 10% by weight. Preferred further components apart from water are water-soluble monohydric alcohols having 1 to 4 carbon atoms.

Also preferred are short-chain dihydric alcohols, such as, for example, ethylene glycol. The additive can be used alone or in combination with other known gas hydrate inhibitors. Typical concentrations of use which are reached in the aqueous phase in contact with the gas are 0.01–2% by weight of additive in water, especially concentrations of 0.02–1.0 % by weight (200–10 000 ppm).

The invention furthermore relates to a process for inhibiting the formation of gas hydrates, wherein 2-isobutoxyethanol is added to the aqueous phase in contact with the gas. 2-isobutoxyethanol is added to the aqueous phase preferably in an amount such that the concentration in the water is more than 0.005% by weight; in particular the 2-isobutoxyethanol concentration may be from 0.01 to 2, especially from 0.02 to 1, % by weight. In the process according to the invention, further gas hydrate inhibitors in addition to 2-isobutoxyethanol may be added to the aqueous phase.

The additive according to the invention and the process according to the invention are particularly suitable for inhibiting hydrates of natural gas.

2-isobutoxyethanol has scarcely any surfactant activity, which is advantageous particularly with respect to the foam effect since conventional surfactant additives often lead to serious foam problems.

If derivatives of maleic acid or of maleic anhydride are used as component b) of the additive, these are preferably semiamides, diamides, half-esters or diesters. Amides or esters preferably carry alkyl radicals having 1 to 7 carbon atoms. In particularly preferred embodiments of the invention, the component b) is a copolymer of vinyl acetate, N-monoisobutylmaleamide and N-mono((3-dimethylamino)propyl)maleamide). Esters and amides of this type can be prepared, for example, by reacting a copolymer of vinyl acetate and maleic acid/maleic anhydride with alcohols and/or amines.

Particularly suitable further gas hydrate inhibitors for mixing with the additive according to the invention or for use in the process according to the invention are polymers having a carbon backbone obtained by polymerization and amide bonds in the side chains. These include in particular polymers such as polyvinylpyrrolidone, polyvinylcaprolactam, copolymers of vinylpyrrolidone and vinylcaprolactam, copolymers of vinylcaprolactam and N-methyl-N-vinylacetamide and terpolymers of vinylpyrrolidone, vinylcaprolactam and further anionic, cationic and neutral comonomers having a vinylic double bond, such as 2-dimethylaminoethyl methacrylate, 1-olefins, N-alkylacrylamides, N-vinylacetamide, acrylamide, sodium 2-acrylamido-2-methyl-1-propanesulfonate (AMPS) or acrylic acid. Mixtures of homo- and copolymers of N,N-dialkylacrylamides such as N-acryloylpyrrolidine, N-acryloylmorpholine and N-acryloylpiperidine are also suitable. Mixtures with alkylpolyglycosides, hydroxyethylcellulose, carboxymethylcellulose and other ionic or nonionic surfactant molecules are also suitable. Mixtures of 2-isobutoxyethanol with gas hydrate inhibitors based on maleic anhydride copolymers reacted with mono- and/or diamines are also particularly suitable for the process according to the invention. Among these, modified vinyl acetate/maleic anhydride copolymers are particularly preferred. These compounds are also preferred as component b) of the additive according to the invention. The additive according to the invention may contain preferably from 0 to 40% by weight, in particular from 5 to 20% by weight, of these further preferred components.

Like the additives according to the invention which contain 2-isobutoxyethanol, 2-isobutoxyethanol can be added to the multiphase mixture susceptible to hydrate formation in petroleum and natural gas production by means of conventional equipment, such as, for example, injection pumps or the like. Owing to the good water solubility of 2-isobutoxyethanol, the inhibitor is rapidly and uniformly distributed in the aqueous phase which has a tendency to hydrate formation. In general, the addition of the aqueous alcoholic, 2-isobutoxyethanol-containing inhibitor mixture is sufficient for achieving a uniform distribution.

2-isobutoxyethanol can be prepared form isobutanol by reaction with ethylene oxide by processes known from the literature. The resulting mixture of glycol ethers can then be separated by distillation to obtain the pure components. In addition to pure 2-isobutoxyethanol, mixtures of isobutanol and/or higher adducts of ethylene oxide with isobutanol are also suitable for use as a gas hydrate inhibitor, provided that 2-isobutoxyethanol is contained therein in a sufficient amount.

Since the inhibitor primarily delays or prevents nucleation and growth of hydrate nuclei it is preferably added before gas hydrate formation occurs, i.e. above the equilibrium temperature of hydrate formation. This is the case, for example, when the inhibitor is added directly to the natural gas source.

The efficiency of the additive/process according to the invention was investigated in a THF hydrate test. Since natural gas hydrates exist only at high pressures which are difficult to achieve under laboratory conditions, the formation of clathrates from THF (tetrahydrofuran) and water is used as a model. These hydrates form at 4° C. at atmospheric pressure in a molar water: THF ratio of 17:1. If an additive exhibits the property of kinetically inhibiting the formation of THF hydrates or keeping the THF hydrates formed stirrable, then this additive/process has a similar effect on the naturally occurring gas hydrates.

As can be shown in the experimental examples mentioned below, THF hydrate formation without an inhibitor (Example 1) begins rapidly under the experimental conditions and leads to the formation of THF hydrates in acicular or lamellar form, which very rapidly cause the entire test solution to solidify. By adding 2-isobutoxyethanol, THF hydrate formation is significantly slowed down and/or the crystal shape of the resulting hydrates is changed in comparison with other alcohols, such as the butanol mentioned in WO-96/08636 or the n-butoxyethanol described by Young et al., at low concentration.

The THF Test was Carried Out as Follows

EXAMPLE 1
(Experiment Without Inhibitor)

A short Pasteur pipette (I=140 mm) is fastened in a drilled cork stopper in such a way that the pipette tip projects 120 mm from the cork stopper. A drop of water is taken up in this pipette by means of capillary action and the pipette (with cork stopper) is tared and cooled for at least 2 h at −20° C. A 3.5% strength sodium chloride solution is mixed with THF in the ratio 4:1.30 ml of this solution are added to a test tube (150×30 mm) and thermostated in a cooling bath at −1° C. (depth of immersion of the test tube in the cooling bath about 60 mm). The frozen pipette is removed from the refrigerator, wiped rapidly (to remove crystal nuclei on the outside of the pipette and thus to obtain standard initial conditions) and immediately immersed to about 15 mm into the above THF/water/sodium chloride mixture, THF hydrates forming after a short time (seconds to a few minutes).

The pipette is very carefully removed from the test tube after 60 min and the pipette with cork stopper and adhering hydrates is immediately tared. The growth rate of the THF hydrate formation (in g/h) is calculated from the difference between the initial and final weights and the time elapsed.

EXAMPLES 2–10

The procedure is as under Example 1, except that 2500 ppm of the corresponding inhibitor are added to the test solution. The evaluation is carried out as above.

The results are summarized in Table 1 and show the greater efficiency of the process according to the invention in comparison with the prior art. Examples 2 to 7 and 9 correspond to the prior art and Examples 8 and 10 relate to the process according to the invention.

TABLE 1

THF test, hydrate growth rates

| Ex. | Inhibitor | Growth rate (g/h) | Structural formula |
|---|---|---|---|
| 1 | none | >20 | |
| 2 | Methanol | >20 | $CH_3OH$ |
| 3 | Isopropanol | 6.7 | $(CH_3)_2CHOH$ |
| 4 | n-Butanol | 6.0 | $CH_3-CH_2-CH_2-CH_2OH$ |
| 5 | Isobutanol | 5.4 | $(CH_3)_2CH-CH_2OH$ |
| 6 | 2-Butoxyethanol | 4.1 | $CH_3-(CH_2)_3-O-(CH_2)_2OH$ |
| 7 | 2-(2-Butoxyethoxy)-ethanol | 8.1 | $CH_3-(CH_2)_3-O-(CH_2)_2-O-(CH_2)_2-OH$ |
| 8 | 2-Isobutoxyethanol | 0.05 | $(CH_3)_2CH-CH_2-O-(CH_2)_2-OH$ |
| 9 | 2-(2-Isobutoxyethoxy)-ethanol | 7.2 | $(CH_3)_2CH-CH_2-O-(CH_2)_2-O-(CH_2)_2-OH$ |
| 10 | Isobutanol × 1.5 EO* | 3.6 | Oxyethylate mixture, contains about 20% by weight of 2-isobutoxyethanol and about 25% by weight of isobutanol |

What is claimed is:

1. An additive for inhibiting gas hydrate formation, containing
   a) from 5 to 90% by weight of 2-isobutoxyethanol,
   b) from 5 to 60% by weight of a copolymer which has structural units which are derived from maleic acid, maleic anhydride or derivatives of maleic acid or of maleic anhydride, and
   c) at least 10% by weight of water or a monohydric or polyhydric alcohol, except the 2-isobutoxyethanol, or mixtures of the stated substances,
based on the total weight of the additive, the sum of the contents of compounds a) and b) being from 10 to 90% by weight.

2. The additive as claimed in claim 1, which contains from 10 to 80, particularly from 15 to 50, % by weight of 2-isobutoxyethanol.

3. The additive as claimed in claim 1, which additionally contains polymers which contain a backbone formed from carbon atoms and whose side chains contain amide bonds.

4. The additive as claimed in claim 3, wherein the polymer is polyvinylpyrrolidone, polyvinylcaprolactam, a copolymer of vinylpyrrolidone and vinylcaprolactam, a copolymer of vinylcaprolactam and N-methyl-N-vinylacetamide or a terpolymer of vinylpyrrolidone, vinylcaprolactam and further anionic, cationic and neutral comonomers having a vinylic double bond, such as 2-dimethylaminoethyl methacrylate, 1-olefin, an N-alkylacrylamide, N-vinylacetamide, acrylamide, sodium 2-acrylamido-2-methyl-1-propanesulfonate (AMPS) or acrylic acid.

5. The additive as claimed in claim 1, wherein the component b) is present in an amount of from 10 to 50% by weight, in particular from 20 to 30% by weight.

6. The additive as claimed in claim 1, which contains a vinyl acetate/maleic anhydride copolymer reacted with mono- and/or diamines.

7. A process for inhibiting the formation of gas hydrates, wherein 2-isobutoxyethanol is added to the aqueous phase in contact with natural gas.

8. The process as claimed in claim 7, wherein the aqueous phase in contact with natural gas contains an additive as claimed in any of claims 1 to 6.

9. The process as claimed in claim 8, wherein the aqueous phase contains at least 0.005% by weight of 2-isobutoxyethanol or an additive as claimed in one or more of claims 1 to 6.

10. A process for inhibiting the formation of gas hydrates, wherein 2-isobutoxyethanol is added to the aqueous phase in contact with natural gas.

11. The process of claim 10 wherein the aqueous phase in contact with said natural gas contains an additive b) of claim 1.

12. The process of claim 10 wherein the aqueous phase in contact with said natural gas contains an additive c) of claim 1.

13. The process of claim 10 wherein the aqueous phase in contact with said natural gas contains an additive in claim 3.

14. The process of claim 10 wherein the aqueous phase in contact with said natural gas contains an additive selected from the group consisting of the additives in claim 4.

15. The process of claim 10 wherein the aqueous phase in contact with said natural gas contains an additive as claimed in claim 6.

16. A process for inhibiting the formation of gas hydrates from gas in contact with water, the process comprising incorporating into said mixture, an additive mixture comprising
   a) from 5 to 90% by weight of 2-isobutoxyethanol
   b) from 5 to 60% by weight of a copolymer which has structural units which are derived from maleic acid, maleic anhydride or derivatives of maleic acid or of maleic anhydride, and
   c) at least 10% by weight of water or a monohydric alcohol or a polyhydric alcohol, except said 2-isobutoxyethanol, or mixtures of said water, monohydric alcohol and/or polyhydric alcohol except 2-isobutoxyethanol,
based on the total weight of said additive mixture, wherein the sum of the contents of compounds a) and b) being from 10 to 90% by weight.

* * * * *